Nov. 13, 1945.    M. KNIGHT ET AL    2,388,786
TRANSPARENT CLOSURE
Filed March 17, 1942    2 Sheets-Sheet 1

Inventors
MILTON KNIGHT.
CLYDE D. LOWRY.
By Frank Fraser
Attorney

Nov. 13, 1945.  M. KNIGHT ET AL  2,388,786
TRANSPARENT CLOSURE
Filed March 17, 1942  2 Sheets-Sheet 2

Inventors
MILTON KNIGHT.
CLYDE D. LOWRY.
By Frank Fraser
Attorney

Patented Nov. 13, 1945

2,388,786

UNITED STATES PATENT OFFICE 2,388,786

TRANSPARENT CLOSURE

Milton Knight, Maumee, and Clyde D. Lowry, Toledo, Ohio, assignors to Libbey-Owens-Ford Glass Company, Toledo, Ohio, a corporation of Ohio Application March 17, 1942, Serial No. 435,075

6 Claims. (Cl. 189—64)

This invention relates to transparent closures for use in windshield and/or window or door installations, and particularly those which are subject to severe operating conditions such as in airplanes and other aircraft.

It has been heretofore proposed to make such a transparent closure of laminated safety glass including two sheets of glass and an interposed layer of thermoplastic adherent thereto to form a unit construction and characterized by having the plastic interlayer extended beyond the edges of the glass sheets and serving the combined purpose of a sealing gasket and a resilient supporting means for the glass itself.

The present invention has for its principal object the provision of an improved form of laminated safety glass of the general type described above in which the extended portion of the plastic interlayer is so formed that it can be effectually secured in place in a positive manner whereby danger of the unit being accidentally or forcibly displaced when subjected to excessive shock or pressures or upon twisting and weaving of the plane will be minimized.

Another object of the invention is the provision of a laminated safety glass unit of the above character in which the extended portion of the plastic interlayer has associated therewith a metal locking member or "key" which serves to effectively anchor the unit in a supporting frame and prevent displacement thereof even when subjected to relatively great pressures such as are present in the supercharged cabins of airplanes.

A further object of the invention is the provision of metal locking or anchoring means associated with the extended portion of the plastic interlayer which will act to retain the plastic interlayer within the supporting frame even though one or both of the glass sheets should be cracked or broken whereby blowing out of the entire unit and complete failure of the closure will be prevented.

A still further object of the invention is the provision of metal locking or anchoring means for the extended portion of the plastic interlayer which is particularly advantageous for holding in place laminated glass units of certain curved shapes such as cylindrical, conical, and spherical when the units are placed under tension by the internal air pressure of the plane.

Other objects and advantages of the invention will become more apparent during the course of the following description, when taken in connection with the accompanying drawings.

In the drawings, wherein like numerals are employed to designate like parts throughout the same:

Figure 1:
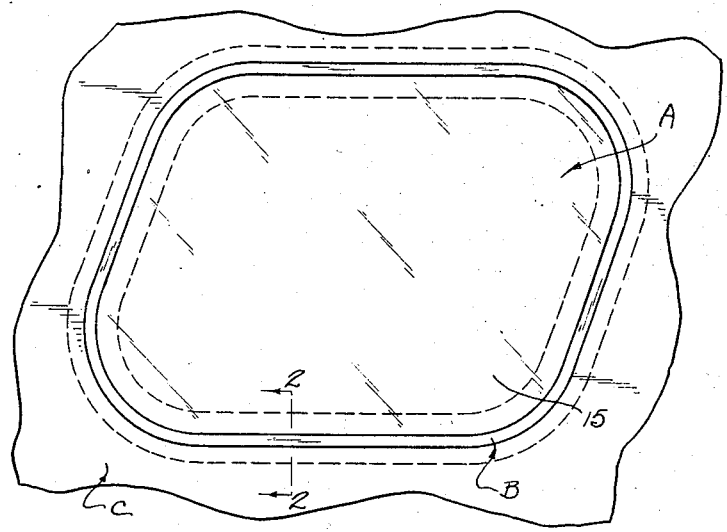
Fig. 1 is a plan view of a laminated safety glass closure unit made in accordance with this invention.
Figure 2:
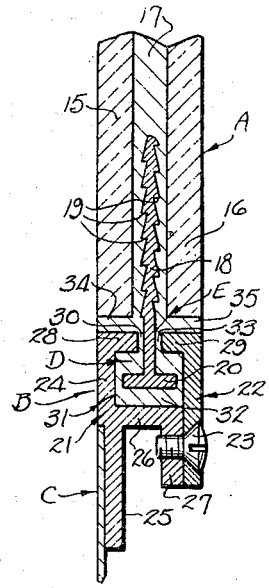
Fig. 2 is a transverse section through one edge portion thereof taken on line 2—2 of Fig. 1.

With reference now to the drawings and particularly to Figs. 1 and 2, there is illustrated a transparent closure unit A mounted in a frame B which may constitute a part of any windshield, window or door construction. However, by way of illustration, the supporting frame will be described as forming part of an airplane fuselage, the outer skin of which is indicated at C and which is suitably cut out to provide the desired opening to be glazed.

The transparent closure unit A comprises a sheet of laminated safety glass including the two sheets or plates of glass 15 and 16 having interposed therebetween and adherent thereto a layer of thermoplastic 17. The glass sheets 15 and 16 may consist of ordinary plate or window glass and may be either fully tempered or semi-tempered, or any desired combination of glass sheets may be used. Likewise, a sheet of relatively hard transparent plastic material such as "Plexiglas" or the like may be substituted for either or both of the glass sheets 15 and 16 if desired.

The plastic interlayer 17 preferably comprises a relatively thick sheet of synthetic resin material such as, for example, a polyvinyl acetal resin. By way of example only, the plastic interlayer may be formed of polyvinyl butyr acetal resin plasticized with approximately 15 to 30 parts dibutyl sebacate per 100 parts of resin by weight. However, different plastics varying in thickness and physical characteristics may be employed, and the invention is not limited to the use of any particular resin, class of resins, cellulosic derivative, or the like.

As shown, the glass sheets 15 and 16 are of the same size, while the area of the plastic interlayer 17 is relatively greater than that of the glass sheets so that it projects therebeyond at one or more edges thereof to provide a combined attaching flange and sealing gasket D. In other words, the extended portion D of the plastic interlayer serves not only as a means for securing the unit within the supporting frame B, but also for maintaining the unit water and air-tight.

In accordance with the invention, there is associated with the plastic interlayer 17, at one or more edges of the unit, a substantially T-shaped metal locking or anchoring member E. The locking member E comprises a metal strip 18 embedded in the plastic interlayer 17 and projecting outwardly beyond the edges of the glass sheets. The opposite surfaces of the metal strip 18 are preferably formed with suitable teeth or serrations 19, while provided at the outer edge of said strip is a transverse head 20 embedded in the extended portion D of the plastic interlayer. The locking member E may be formed of any suitable metal, such as aluminum, steel, tin, galvanized metal, or the like, and is preferably sufficiently thin so that it has a certain degree of flexibility. The thickness of the metal may of course vary, depending upon the degree of flexibility desired. The extended portion D of the plastic interlayer is molded to and around the extended portion of the metal locking member E and is of the desired cross section to fit snugly within the supporting frame B.

The supporting frame B comprises a stationary section 21 disposed inwardly of and fixed to the skin C of the plane, and a removable section 22 secured to said stationary section by screws or the like 23. The stationary section 21 includes a front wall 24 preferably flush with the skin C of the plane and provided with an inwardly offset extension 25 disposed inwardly of said skin. Formed integral with and extending at right angles to the front wall 24 is a transverse wall 26 terminating in an outwardly projecting flange 27 to which the inner section 22 is removably secured by the screws 23.

The outer and inner frame sections 21 and 22 are provided at their inner ends with inwardly directed lips 28 and 29 respectively to form a restricted passage 30 therebetween communicating with a laterally enlarged channel 31 in supporting frame B. It will be noted in Fig. 2 that the extended plastic flange D has a laterally enlarged or thickened body portion 32 of the same cross section as the channel 31 in supporting frame B and adapted to fit snugly therein, said body portion being connected by a relatively thin web portion 33 with the laterally and oppositely directed wing portions 34 and 35 disposed between the lips 28 and 29 of the frame and the peripheral edges of the glass sheets 15 and 16 respectively.

With the construction illustrated in Fig. 2, it will be seen that when the extended plastic D is received within the channel 31 in supporting frame B and the frame sections 21 and 22 secured together by screws 23, the extended plastic will be firmly locked in place in said frames and will be held in a firm, positive manner against displacement. The transverse head 20 of the metal locking member E, being wider than the space between the lips 28 and 29, will effectively prevent the metal locking member from being pulled out of the frame. On the other hand, the teeth or serrations 19 on metal strip 18 will serve to minimize danger of the metal locking member being pulled out from between the glass sheets. The metal locking member therefore serves as a key or anchor to secure the unit in a positive manner in the supporting frame B.

Since the extended portion D only of the plastic interlayer 17 is clamped in the frame B, the laminated unit A will be permitted a certain amount of floating movement to and fro in the opening due to the resiliency of the plastic. Because of this, the glass sheets 15 and 16 will be "cushioned" against mechanical vibration, shocks, torsional stresses, etc., of the plane when in flight, thereby reducing or eliminating the tendency of cracking or shattering of the glass from such causes. Furthermore, due to the soft, pliable nature of the extended plastic, it will serve as a gasket to seal the unit against the entrance of water and air.

Another advantage of this type of unit is that due to the fact that the extended plastic D is locked or anchored in the frame B, complete failure of the closure will be prevented even though one or both of the glass sheets 15 and 16 should be broken. In other words, since the plastic interlayer 17 is locked or anchored in place, the entire unit will be prevented from blowing out of the frame in case the glass breaks and the pressure is transferred to the plastic. This is especially important in high altitude flying where failure of the closure may have serious and even fatal effects on the pilot and crew.

It will be further noted that this construction provides a so-called "flush" type of installation which is also of particular advantage when used in airplanes. Thus, the outer surface of the outer glass sheet 15 is flush with the outer surface of the frame B and also with the skin C of the plane so as not to break the streamlined surfaces of the plane whereby wind resistance is materially reduced.

Because of the flexibility of the plastic attaching flange D and metal locking member E, the glazing unit can be readily accommodated to certain irregularities in the supporting frame as well as to irregularities in the laminated structure itself at time of installation without placing any undue strain upon the glass. This is particularly important in the glazing of airplanes due to the many curved surfaces and because of the difficulty in always obtaining a perfect matching of all of the parts. Therefore, while the laminated structure of Figs. 1 and 2 has been shown as comprising a flat unit, it may be shaped to any desired curvature. As a matter of fact, laminated glass units of the character above described may be made in cylindrical, conical, or spherical shapes, and the present invention is of especial importance when such units are placed under tension by the internal pressure in the plane.

Figure 9:
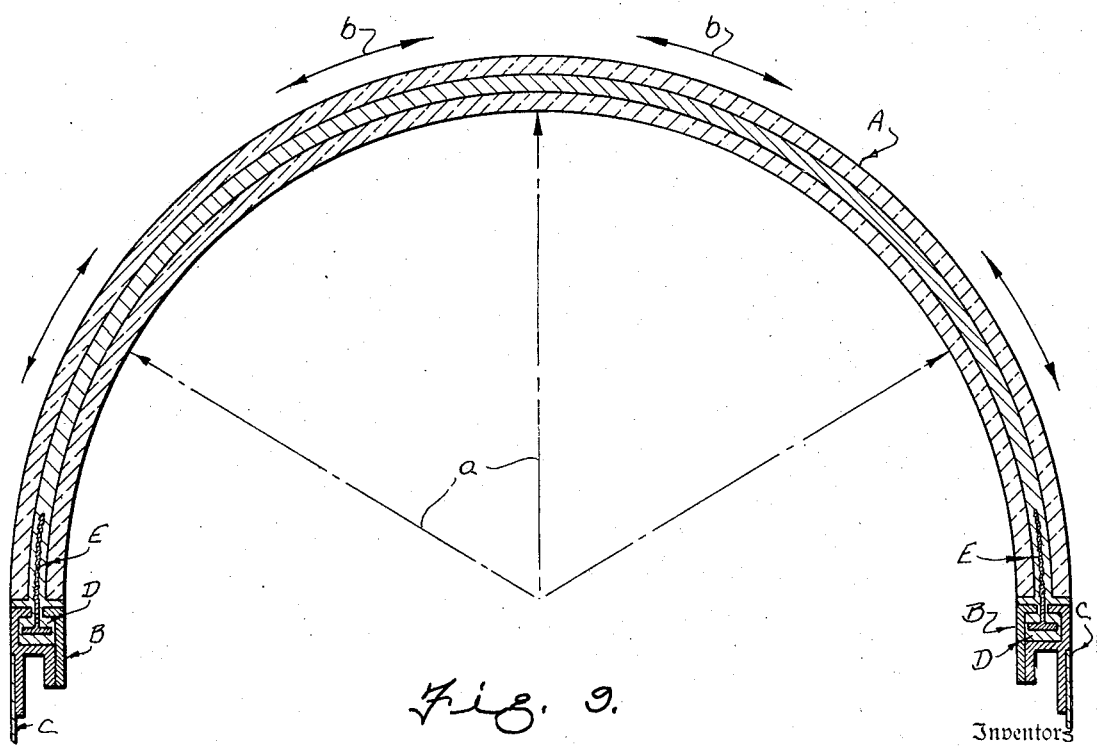
Fig. 9 is a transverse sectional view showing the mounting of a laminated closure unit which is under tension.

By way of example, there is illustrated in Fig. 9 a semi-cylindrical laminated unit A of the same construction illustrated in Fig. 2 and secured in similar supporting frames B. When this type of unit is used in pressurized cabins for high altitude flying, the internal pressure of the plane will be applied uniformly to all portions of the unit as indicated by the arrows a. Due to the shape of the unit and the mounting thereof, this internal pressure on the glass will be translated into tension stress on the unit as indicated by the arrows b, thereby placing the unit under tension. In other words, the pressure upon the unit does not act to bend the glass but rather tends to force the unit out of the supporting frames. This pressure upon the unit is transformed into tension in the extended plastic and the unit will be maintained under tension so long as the extended plastic is held in the supporting frames. Obviously, should the securing means for the extended plastic be unable to hold the unit, the tension in the plastic will be released and the unit forcibly blown out. The novel means herein provided for locking the extended portions of the plastic within the supporting frames permits the unit to be maintained under tension with minimum danger of glass breakage and effectively prevent accidental of forcible displacement of the unit.

Figure 3:
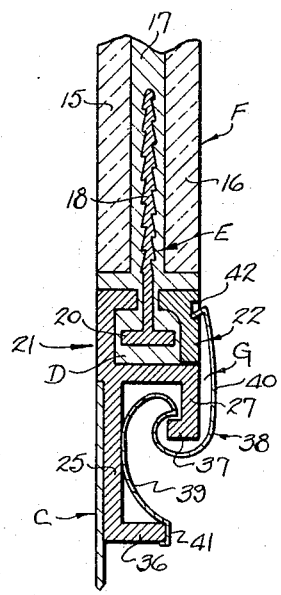

In Fig. 3 is illustrated a transparent closure unit F similar to that shown in Fig. 2 and being mounted in the supporting frame G in substantially the same manner. The same reference numerals used in Fig. 2 are therefore used to designate similar parts in Fig. 3. As here shown, however, the offset flange 25 of stationary frame section 21 is provided at its outer end with a rearwardly directed foot 36, while the flange 27 of said section is provided with a forwardly directed lip 37. The removable frame member 22 is disposed inwardly of the flange 27 and secured in place by a spring member 38. This spring member comprises two reversely disposed, substantially C-shaped portions 39 and 40, the portion 39 being provided at its outer end with a clip 41 engaging the foot 36, while the portion 40 is provided at its outer end with a hook 42 received within a groove formed in the removable frame section 22. The portion 40 of spring member 38 curves inwardly around the lip 37 and is held in place thereby.

Figure 4:
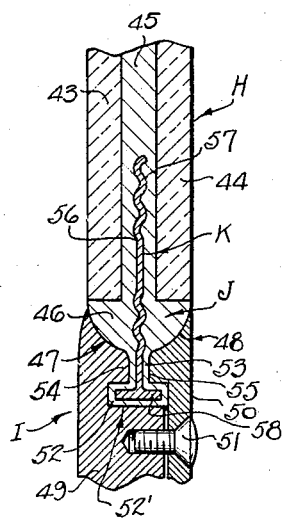
Figs. 3, 4 and 5 are transverse sections showing modified types of units also embodying the invention.

In Fig. 4 is illustrated a transparent closure unit H mounted in a supporting frame I. The unit H comprises a sheet of laminated safety glass including two sheets of glass 43 and 44 and a thermoplastic interlayer 45 adherent thereto. As here shown, the plastic interlayer 45 also extends beyond the edges of the glass sheets 43 and 44 to provide an attaching flange J. The attaching flange J comprises a substantially semi-cylindrical body portion 46 adapted to engage the correspondingly shaped inner edges 47 and 48 of the stationary and removable frame members 49 and 50 respectively, which are secured together by screws or the like 51. Formed integral with the body portion 46 of attaching flange J is a transverse head 52 connected with said body portion by a reduced web 53, said head 52 being received within a channel 52' in the frame I, while the reduced web 53 is received between the opposed lips 54 and 55 on the frame sections 49 and 50.

Embedded in the plastic interlayer 45 is a metal locking member K of substantially T-shape in cross section and comprising a strip 56 corrugated as at 57, said strip projecting outwardly beyond the edges of the glass sheets and formed at its outer end with a transverse locking portion 58 embedded in the transverse head 52 of the plastic attaching flange J. Since the transverse locking portion 58 of the metal locking member K is wider than the distance between the lips 54 and 55, it will be obvious that the locking member cannot be pulled from the frame even though the unit is subjected to severe shock or pressure. Likewise, the corrugated portions 57 on strip 56 serve to prevent the metal lock from pulling out from between the glass sheets. Due to the particular shape of the body portion 46 of the extended plastic, any pressure on the glass throws the plastic into compression, reducing shear strain and also permitting the plastic body portion to rotate on a semi-ball and socket joint in the frame under strain or pressure.

Figure 5:
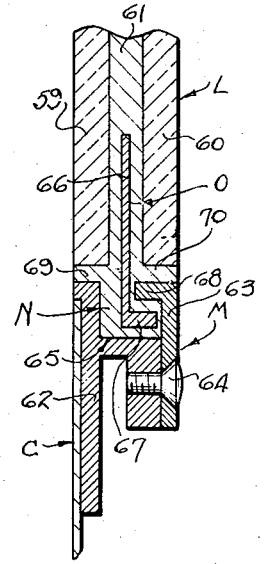

In Fig. 5 is illustrated still another form of transparent closure unit L mounted in a supporting frame M. The unit comprises a sheet of laminated safety glass including two sheets of glass 59 and 60 and an interposed layer of thermoplastic 61, with the plastic interlayer extending beyond the edges of the glass sheets to provide an attaching flange N. The supporting frame M includes the outer and inner sections 62 and 63 secured to one another by screws or the like 64, said frame sections cooperating to provide a channel 65 for receiving the extended portion N of the plastic interlayer therein. Carried by the plastic interlayer is a metal locking member O comprising a flat strip 66 received between the glass sheets and a laterally directed locking portion 67 at its outer end embedded in the extended plastic. The removable section 63 of the supporting frame is provided with a forwardly directed lip 68 overlying the locking portion 67 of locking member O to securely anchor the unit in place. The extended portion N of the plastic interlayer is also formed with the oppositely directed wing portions 69 and 70 disposed between the frame sections 62 and 63 and the peripheral edges of the glass sheets 59 and 60 respectively.

Figure 6:
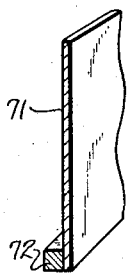
Figs. 6, 7 and 8 are perspective sectional views showing different types of metal locking or anchoring members for the extended plastic.
Figure 7:
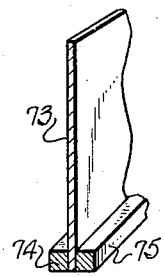
Figure 8:
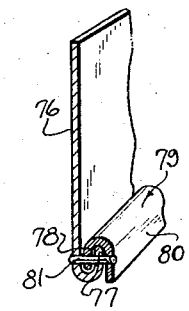

In Figs. 6, 7 and 8 are shown three different types of metal locking members. In Fig. 6 the locking member comprises a flat plate portion 71 having welded or otherwise suitably secured to one side thereof along its outer edge a locking or key strip 72. In Fig. 7 the locking member includes a plate portion 73 having secured to the opposite faces thereof along its outer edge the locking strips 74 and 75. In Fig. 8 the locking member comprises a plate portion 76 provided along its outer edge with a rebent flange 77. Received behind the flange 77 is one leg 78 of a substantially inverted U-shaped locking strip 79 having its other leg 80 disposed outwardly of flange 77. The locking strip 79 is secured to the flange 77 by transverse pins or the like 81.

Figure 10:
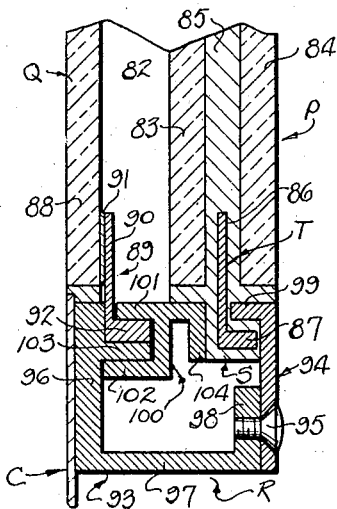
Fig. 10 is a transverse sectional view through a double glazing unit also embodying the invention.

In Fig. 10 is illustrated a double glazing unit including an inner transparent panel P and an outer transparent panel Q mounted in spaced relation within a supporting frame R to provide an air space 82 therebetween. The inner panel P consists of a sheet of laminated safety glass including the two sheets of glass 83 and 84 and interposed adherent layer of thermoplastic 85. The plastic interlayer 85 extends beyond the edges of the glass sheets to provide an attaching flange S. Associated with the plastic interlayer 85 is a metal locking member T comprising a substantially flat plate portion 86 provided at its outer edge with a laterally projecting foot 87 embedded in the extended plastic S.

The outer transparent panel Q preferably consists of a single sheet of glass 88 to the inner surface of which is secured a metal locking member 89, said member comprising a substantially flat plate portion 90 secured to the glass sheet 88, preferably by a metallic connection 91, and provided along its outer edge with a laterally extended foot 92. The metallic connection 91 may be formed by spraying or otherwise applying a metallic coating of copper or a copper alloy to the glass and then securing the metal locking member 89 to the metallic coating by soldering or the like.

The supporting frame R comprises a stationary section 93 and a removable section 94 secured to said fixed section by screws or the like 95. The fixed section 93 comprises a front wall 96, outer wall 97 and inner wall 98 substantially parallel with outer wall 96. The removable section 94 is secured to the wall 98 of fixed section 93 by the screws 95 and said inner section is also provided at its inner end with a forwardly directed flange 99 overlying the foot 87 of the metal locking member T of inner transparent panel P.

Arranged between the inner and outer frame sections 93 and 94 is an intermediate section 100 comprising a substantially U-shaped horizontal portion having a leg 101 overlying the foot 92 of the metal locking member 89 of outer transparent panel Q and a second leg 102 disposed beneath a rearwardly directed ledge 103 formed integral with the front wall 96 of fixed section 93. The intermediate section 100 is also provided with a portion 104 engaging the extended plastic S of inner panel P. With this construction, it will be readily evident that both the inner and outer transparent panels are securely anchored or locked in place so that accidental or forcible displacement thereof will be effectively prevented.

It is to be understood that the forms of the invention herewith shown and described are to be taken as illustrative embodiments only of the same, and that various changes in the shape, size and arrangement of parts may be resorted to without departing from the spirit of the invention or the scope of the subjoined claims.

We claim:

1. A transparent closure comprising a sheet of laminated safety glass including two sheets of glass and an interposed layer of plastic material adherent thereto, said plastic interlayer extending beyond the edges of the glass sheets, and a metal member embedded in the plastic interlayer and having a portion thereof received between the glass sheets and another portion projecting outwardly therebeyond and embedded in the extended portion of said plastic, the extended portion of said metal member being provided with a laterally enlarged portion.

2. A transparent closure comprising a sheet of laminated safety glass including two sheets of glass and an interposed layer of plastic material adherent thereto, said plastic interlayer extending beyond the edges of the glass sheets and said extended portion being of a relatively greater thickness than the thickness of the plastic between said sheets, and a metal member carried by the plastic interlayer and having a portion thereof received between the glass sheets and another portion projecting outwardly beyond the edges thereof into the extended portion of said plastic, the projecting portion of said metal member being provided with a laterally enlarged portion embedded in the thickened portion of the extended plastic.

3. A transparent closure comprising a sheet of laminated safety glass including two sheets of glass and an interposed layer of plastic material adherent thereto, said plastic interlayer extending beyond the edges of the glass sheets, a metal locking member embedded in the plastic interlayer and having a portion thereof received between the glass sheets and another portion projecting outwardly therebeyond and embedded in the extended portion of said plastic, the extended portion of said metal locking member being provided with a laterally enlarged locking portion, and a mounting means for receiving the extended plastic and having a part disposed inwardly of and overlying the laterally enlarged locking portion of said metal locking member to hold it in place.

4. A transparent closure comprising a sheet of laminated safety glass including two sheets of glass and an interposed layer of plastic material adherent thereto, said plastic interlayer extending beyond the edges of the glass sheets and said extended portion being of a relatively greater thickness than the thickness of the plastic between said sheets, a metal locking member carried by the plastic interlayer and having a portion thereof received between the glass sheets and another portion projecting outwardly beyond the edges thereof into the extended portion of said plastic, the projecting portion of said metal locking member being provided with a laterally enlarged locking portion embedded in the thickened portion of the extended plastic, and a mounting means for receiving the extended portion of the plastic and having a part disposed inwardly of and overlying the thickened portion of the extended plastic and also the laterally enlarged locking portion of said metal locking member to lock the closure within said mounting means.

5. A transparent closure comprising a sheet of laminated safety glass including two sheets of glass and an interposed layer of plastic material adherent thereto, said plastic interlayer extending beyond the edges of the glass sheets and said extended portion comprising a body portion of relatively greater thickness than the plastic between said sheets connected by a relatively thinner web portion with laterally and oppositely directed wing portions engaging the peripheral edges of the said sheets, a locking member formed of flexible sheet metal embedded in the plastic interlayer and having a portion thereof received between the glass sheets and another portion projecting outwardly beyond the edges thereof into the extended portion of said plastic, the projecting portion of said metal locking member being provided with a laterally enlarged locking portion embedded in the body portion of the extended plastic, and a mounting means provided with a channel for receiving the body portion of the extended plastic therein and also having a part thereof disposed inwardly of and overlying said body portion and also the laterally enlarged locking portion of said metal locking member and engaging the web portion of the extended plastic to lock the closure within said mounting means.

6. A transparent closure for a sight opening, including a sheet of plastic material provided with marginal portions extending beyond the edges of said sight opening, and a metal member embedded in the plastic sheet and having a portion thereof extending into the sight opening when the closure is in operating position and another portion projecting outwardly therebeyond and embedded in the extended marginal portion of the plastic sheet, the outwardly extending portion of said metal member being provided with a laterally enlarged portion.

CLYDE D. LOWRY.
MILTON KNIGHT.